(12) United States Patent
Fukui et al.

(10) Patent No.: US 11,773,902 B2
(45) Date of Patent: Oct. 3, 2023

(54) LINEAR MOTION MECHANISM SIDE SEAL UNIT AND LINEAR MOTION MECHANISM

(71) Applicant: SANWA TECHNO CO., LTD, Kobe (JP)

(72) Inventors: Kazuro Fukui, Kobe (JP); Masashi Kouhara, Kobe (JP); Toshio Takino, Kobe (JP); Kazuki Inoue, Kobe (JP)

(73) Assignee: SANWA TECHNO CO., LTD., Kobe (JP)

( * ) Notice: Subject to any disclaimer, the term of this patent is extended or adjusted under 35 U.S.C. 154(b) by 0 days.

(21) Appl. No.: 16/065,444

(22) PCT Filed: Dec. 24, 2015

(86) PCT No.: PCT/JP2015/086138
§ 371 (c)(1),
(2) Date: Jun. 22, 2018

(87) PCT Pub. No.: WO2017/109924
PCT Pub. Date: Jun. 29, 2017

(65) Prior Publication Data
US 2019/0017544 A1 Jan. 17, 2019

(51) Int. Cl.
*F16C 29/08* (2006.01)
*F16C 29/00* (2006.01)
(Continued)

(52) U.S. Cl.
CPC .............. *F16C 29/005* (2013.01); *B32B 3/00* (2013.01); *F16C 29/00* (2013.01); *F16C 29/001* (2013.01);
(Continued)

(58) Field of Classification Search
CPC ........ F16C 29/086; F16C 29/08; F16C 33/72; F16C 33/74; F16C 33/741; F16C 33/743
See application file for complete search history.

(56) References Cited

U.S. PATENT DOCUMENTS 3,494,673 A * 2/1970 Wilcox .............. B23Q 11/0875
384/15
2007/0269148 A1* 11/2007 Michioka ............ F16C 29/0647
384/15

FOREIGN PATENT DOCUMENTS

JP 3-22155 U 3/1991
JP 2004-340343 A 12/2004
(Continued)

OTHER PUBLICATIONS

Machine translation of JP 5255168 B1, retrieved May 2020.*
Machine translation of JP2005255168B1 (Year: 2022).*
International Search Report dated Feb. 9, 2016, issued in counterpart application No. PCT/JP2015/086138, w/English translation. (5 pages).

*Primary Examiner* — Alexander S Thomas
(74) *Attorney, Agent, or Firm* — WHDA, LLP (57) ABSTRACT

Linear motion mechanism sealants capable of operating at low torque when engaging in linear motion which are capable of carrying out sealing with respect to fine particulate several μm in diameter, and which are side seal units for sealing gaps at a shaft provided at a front end portion and a back end portion of a slider of a linear motion mechanism equipped with said shaft and said slider which carries out reciprocating linear motion on said shaft, the linear motion mechanism side seal units 4 being characterized in that fibrous surfaces of seal members comprising fibrous material are arranged so as to be directed toward said shaft in such fashion as to abut and conform to the cross-sectional shape of said shaft at the front end portion and the back end portion of the slider.

12 Claims, 5 Drawing Sheets

(51) Int. Cl.
  *F16C 33/72* (2006.01)
  *F16C 33/78* (2006.01)
  *F16C 29/06* (2006.01)
  *B32B 3/00* (2006.01)

(52) U.S. Cl.
  CPC ........ *F16C 29/004* (2013.01); *F16C 29/0609* (2013.01); *F16C 29/0654* (2013.01); *F16C 29/086* (2013.01); *F16C 33/72* (2013.01); *F16C 33/723* (2013.01); *F16C 33/782* (2013.01); *F16C 29/06* (2013.01); *F16C 29/0623* (2013.01); *F16C 33/783* (2013.01); *F16C 2202/10* (2013.01)

(56) References Cited

FOREIGN PATENT DOCUMENTS

| | | | |
|---|---|---|---|
| JP | 2005-200811 A | 7/2005 | |
| JP | 2005-337407 A | 12/2005 | |
| JP | 2009-138791 A | 6/2009 | |
| JP | 2009-265191 A | 11/2009 | |
| JP | 2013-122321 A | 6/2013 | |
| JP | 5255168 B1 * | 8/2013 | ........... F16J 15/3268 |

\* cited by examiner

LINEAR MOTION MECHANISM SIDE SEAL UNIT AND LINEAR MOTION MECHANISM

TECHNICAL FIELD

The present invention relates to a linear motion mechanism side seal unit and a linear motion mechanism.

BACKGROUND ART

Linear motion mechanisms are mechanisms for which accuracy in positioning is required during linear motion while also permitting reduction in friction, or component parts that are otherwise indispensable to mechanisms for which it is desired that linear motion be carried out. One mechanism typical thereof is a linear motion guide device which is referred to as a "linear guide" or an "LM Guide" (registered trademark). Broadly speaking, this linear motion mechanism is made up of two components, these being a shaft and a slider, the slider being for proceeding in reciprocating linear motion in smooth fashion on the shaft, and the slider having "rolling bodies" or balls arranged at the interior thereof at locations that come in contact with the shaft. In addition, among the mechanisms equipped with slider(s) and shaft(s) that are referred to as linear motion mechanisms in the context of the present invention, besides mechanisms employing linear motion guide rail(s) that are equipped with rolling body groove(s) on shaft(s) of rectangular cross-section such as linear motion guide devices (linear guides and LM Guides), there are linear bushings in which slider(s) on cylindrical shaft(s) slide forward and backward in axial direction(s) thereof, and ball-spline devices employing splined shaft(s) capable of greater load capacities due to the fact that ball(s) are made to roll in groove(s) provided on surface(s) of cylindrical shaft(s).

In terms of mechanical motion, there is linear motion and rotational motion, and while positioning mechanisms for each are known, compared with the situation for rotational motion in which shaft supports that employ bearings and the like enjoy widespread practical use, practical implementation of rolling bodies for linear motion is said to be sophisticated and extremely difficult technologically. Ability to employ rolling bodies for linear motion would bring with it the promise of increased utility, as coefficients of rolling friction are low, resistance to initiation of movement is also low, and so forth. Of course, for practical implementation thereof, it would be necessary to provide a linear motion mechanism which is a mechanism that satisfies a number of requirements which include the requirement that it have high stiffness and that it operate at high speed with light movement and low force, and the requirement that the mechanism have high accuracy in positioning and long life, and so it has not been easy as a practical matter to meet the required criteria. And at the present time there is all the more demand for additional ingenuity to address such needs.

For example, with regard to longevity, with a conventional linear motion mechanism, if dust and/or contaminant from the exterior enters the slider interior, it is clear that this will cause deterioration in rolling body lubricity and reduction in slider life. This being the case, there has been a need to give attention during design and make improvements with respect to protection against dust so as to prevent entry of dust and contaminants into the slider interior.

To prevent entry of dust and contaminants into the slider interior, it has therefore been proposed that in addition to the conventional linear motion mechanism a structure be formed to prevent entry of dust and contaminants by adopting a structure in which the slider unit is provided with a slider side seal in which resin or elastomeric material is molded in a shape that will accommodate the linear motion guide rail (see Patent Reference No. 1 and Patent Reference No. 2).

However, with the side seals of the foregoing respective Patent References, because the material at the lip portion which is in contact with the linear motion guide rail in the linear motion guide device has been resin or elastomeric material, it has had inadequate ability to form a seal, and it has been impossible to improve seal characteristics sufficient to prevent entry of fine particulate for which diameter is on the order of several μm even when used under ordinary conditions. First, because a rubber-like seal member has high viscoelasticity and high coefficient of friction, it wears rapidly and tends to generate heat due to friction. Furthermore, if a sponge-like seal member is used, entry of powder and so forth into the voids of the seal member will tend to cause seal characteristics to more readily deteriorate. Furthermore, when used under harsh conditions, there has been a tendency for the lip portion to become damaged or upturned, and when used under such conditions that there has been one-sided contact, there has been increased tendency for gaps to form between the lip portion and the linear motion guide rail.

It has therefore not been easy with a conventional seal structure to maintain a sealed structure over a long period of time, and there has been a tendency during use for this to allow leakage of lubricating oil from the linear motion guide rail portion and/or entry of dust and/or contaminants into the slider interior. As a result, there has been abrasion of the rail, this has invited problems such as damage to other parts of the mechanism within the linear motion guide device, and the device has stopped operation due to errors and the like. This then makes it necessary for maintenance operations to be carried out more frequently than originally intended. In an attempt to preemptively prevent such trouble, this then results in imposition of frequently scheduled maintenance operations for the apparatus; however, any restriction affecting the continuous uptime of the device will have a large effect at a site where production is being carried out. Thus, protection against dust for increased life is a problem that remains unsolved, there being strong demand for further improvements with respect thereto.

PRIOR ART REFERENCES

Patent References

Patent Reference No. 1: Japanese Patent Application Publication Kokai No. 2013-122321
Patent Reference No. 2: Japanese Patent Application Publication Kokai No. 2004-340343

SUMMARY OF INVENTION

Problem to be Solved by Invention

With conventional side seals in a linear motion mechanism, because, for example, the material at the lip portion which is in contact with the linear motion guide rail has been resin or elastomeric material, it has been extremely difficult to use this to carry out sealing with respect to fine particulate of diameter on the order of several μm even when used under ordinary conditions. Furthermore, when used under harsh conditions, there have been situations in which the lip portion has become damaged and/or upturned, there have been conditions which have caused occurrence of one-sided contact, and gaps have formed between the lip portion and the linear motion guide rail. As a result, the sealing mechanism could not be maintained, and this allowed entry of dust and/or contaminants into the slider interior and/or leakage of lubricating oil.

A problem to be solved by the present invention is therefore to cause a seal member of a side seal unit for use at either shaft end portion of a slider in a linear motion mechanism to be capable of operating at low torque when engaging in linear motion while being imparted with improved ability to better follow the shaft of the linear motion guide rail or the like while being imparted with seal characteristics at the front end portion and back end portion of that slider that are respectively improved as compared with conventional resin or elastomer so as to permit sealing with respect to not only dust and contaminants but also fine particulate on the order of several μm in diameter. In addition, it is also to make it possible for side seal unit(s) for use at said linear motion mechanism to be capable of being removed in simple fashion from attachment(s) so as to make it possible to easily carry out replacement thereof in the event that seal member(s) become worn.

Furthermore, another problem to be solved by the present invention is to make it so that even when oil with which the seal member of the aforementioned linear motion mechanism side seal unit was impregnated is no longer present, life from that point forward will be long as compared with preexisting devices, and longer time will be available to notice that the apparatus has run out of oil, so that a state can be maintained over a long period which is such that there is no leakage of dust, contaminants, or powder, and to effectively prevent occurrence of damage and problems at the device, and in the event that there is no longer any oil, to increase the distance over which the shaft of the linear motion guide rail or the like can be followed while seal characteristics are maintained, while preventing occurrence of damage and problems at the device due to entry of fine particulate for which diameter is on the order of several μm as well as dust and/or contaminants, and adequately ensure that there is ample time until resupply of oil and replacement of seal member(s) in accordance with maintenance procedures.

Means For Solving Problem

First means in accordance with the present invention for solving the foregoing problems are side seal units for sealing gaps at a shaft provided at a front end portion and a back end portion of a slider of a linear motion mechanism equipped with said shaft and said slider which carries out reciprocating linear motion on said shaft, the linear motion mechanism side seal units being characterized in that fibrous surfaces of seal members comprising fibrous material are arranged so as to be directed toward said shaft in such fashion as to abut and conform to the cross-sectional shape of said shaft at the front end portion and the back end portion of the slider.

Second means therefor are linear motion mechanism side seal units according to a first example characterized in that the seal members comprising fibrous material employ cut pile, said cut pile being napped cut pile in which tips of loops of pile fibers raised so as to be directed still further toward an inner surface from a ground yarn portion of the cut pile which is secured to the inner surface of a base have been cut. The base comprises metal, resin, or a combination of metal and resin. Where the base is made of metal, because it may be bent as appropriate to conform to the shape of the casing at either end of the slider and the shaft, it will be easy to attain a stable base permitting attainment of good contact characteristics. Or the base may employ resin(s) that can be molded in integral fashion using die(s) and that are ABS resin(s) or other such general-purpose plastic(s) and/or polyacetal resin(s) (POM) or other such engineering plastic(s) or the like. Because such plastic resin(s) are light and tend to be unrestricted in their movement, and as no excessive heat or forces act thereon, there being no concern with respect to occurrence of problems with endurance, they may be preferably employed.

Third means therefor are the linear motion mechanism side seal units according to a second example characterized in that the cut pile ground yarn portion has a double-woven fabric structure in which both the warp and the weft are double-woven and which comprises two layers, these being a front layer portion in which there is a front lining warp yarn and a front weft yarn, and a back layer portion in which there is a back lining warp yarn and a back weft yarn, the pile fibers being captured by the back weft yarn. Note that the s-type cut pile at the Working Examples, described below, corresponds to an example of the third means.

Fourth means therefor are the linear motion mechanism side seal units according to the second example characterized in that the cut pile ground yarn portion has a double-woven fabric structure in which both the warp and the weft are double-woven and which comprises two layers, a front lining warp yarn (a) and a front lining warp yarn (b) intersecting in alternating fashion, sandwiching a front weft yarn therebetween, to form a front layer portion, a back lining warp yarn (c) and a back lining warp yarn (d) intersecting in alternating fashion, sandwiching a back weft yarn therebetween, to form a back layer portion, pile fiber captured by back weft yarns comprising two fibrous materials (e) and (f), the pile fiber (e) and the pile fiber (f) being alternately captured by adjacent ones of the back weft yarns. Note that the t-type cut pile at the Working Examples, described below, corresponds to an example of the fourth means.

Fifth means therefor are the linear motion mechanism side seal units according to the first example characterized in that the seal members comprising fibrous material comprise a felt-like nonwoven fabric.

Sixth means therefor are the linear motion mechanism side seal units according to other examples characterized in that the seal members comprising fibrous material are wet seal members in which lubricant is retained in spaces between fibers.

Seventh means therefor is a linear motion mechanism equipped with a linear motion mechanism side seal unit according to any one of claims 1 through 5 other examples.

Benefit of Invention

A seal member at a linear motion mechanism side seal unit in accordance with the present invention, by using seal member(s) comprising fibrous material(s) at surface(s) coming in contact with linear motion guide rail(s) and/or shaft(s), makes it possible to obtain a benefit whereby ability to follow the shaft (linear motion guide rail) is improved as compared with the conventional situation in which the seal member is such that the material at the lip portion of the side seal is only resin or elastomer. In addition, this consequently makes it possible to obtain a benefit whereby it is possible to seal out not only dust and/or contaminants but also even fine particulate for which diameter is on the order of several μm.

Furthermore, because it is a fibrous material, it is easy to cause a sufficient quantity of lubricant to be retained between the fibers, and because lubricant is made to ooze into the spaces between it and the shaft and be supplied thereto with each forward and backward sliding motion of the slider, it is possible for the seal to be maintained for a longer period of time.

Furthermore, because seal members in accordance with the present invention are constituted so as to be easily removably attached in the form of attachments at the front end portion and the back end portion of the slider, it is possible for them to be removed in simple fashion from the slider and replaced, so that it is possible to easily and smoothly carry out replacement in the event that the seal members become worn.

In addition, the present invention makes it possible to ensure that even when oil lubricant with which the seal member of the linear motion mechanism side seal unit has been impregnated is no longer present, life from that state forward will be long, being anywhere from on the order of at least 4 to 5 times to—depending on ambient conditions—on the order of 1,000 times that of preexisting devices. As a result, it will be possible to ensure that longer time is available for the user to notice that the apparatus has run out of oil. In addition, because in the meantime there is no leakage of dust, contaminants, or powder, and it is possible to effectively prevent occurrence of damage and problems at the device, it is possible in the meantime to easily avoid trouble by supplying oil lubricant and replacing seal member(s) in accordance with maintenance procedures, and there is good flexibility with respect to the timing with which maintenance operations are carried out. In addition, it is possible to obtain a benefit whereby damage and problems at the device can effectively be prevented from occurring for a longer period of time.

Because the cut pile is such that the tips thereof are cut and napped, fibers spread out in radial fashion as one proceeds toward the tips. This therefore facilitates retention of oil components of lubricant in the spaces between the fibers of the cut pile. Furthermore, because the fibers are spread out such that gaps are eliminated, fine particulate tends not to invade the interior, and it possible to obtain better dust protection effect. Furthermore, in the region peripheral to the weft yarn that secures and supports the cut pile, there is a tendency for occurrence of locations that are bunched up such that the cut pile is prevented from spreading out in radial fashion, and the cut pile locations near the roots in the vicinity of the ground yarn portion is such that there is a greater tendency for gaps to form at the peripheral region than at the tips. But because the front layer portion and the lower layer portion of a double-woven fabric in which both the warp and the weft are double-woven have a certain degree of thickness, the gaps therebetween are filled by the ground yarn portion thereof And because the ground portion has a certain degree of thickness, there is less tendency for gaps to form at root portions of the napped cut pile.

EMBODIMENTS FOR CARRYING OUT INVENTION

Embodiments of linear motion mechanism side seal units and linear motion mechanisms associated with the present invention will be described in detail with reference to the drawings.

Figure 1:
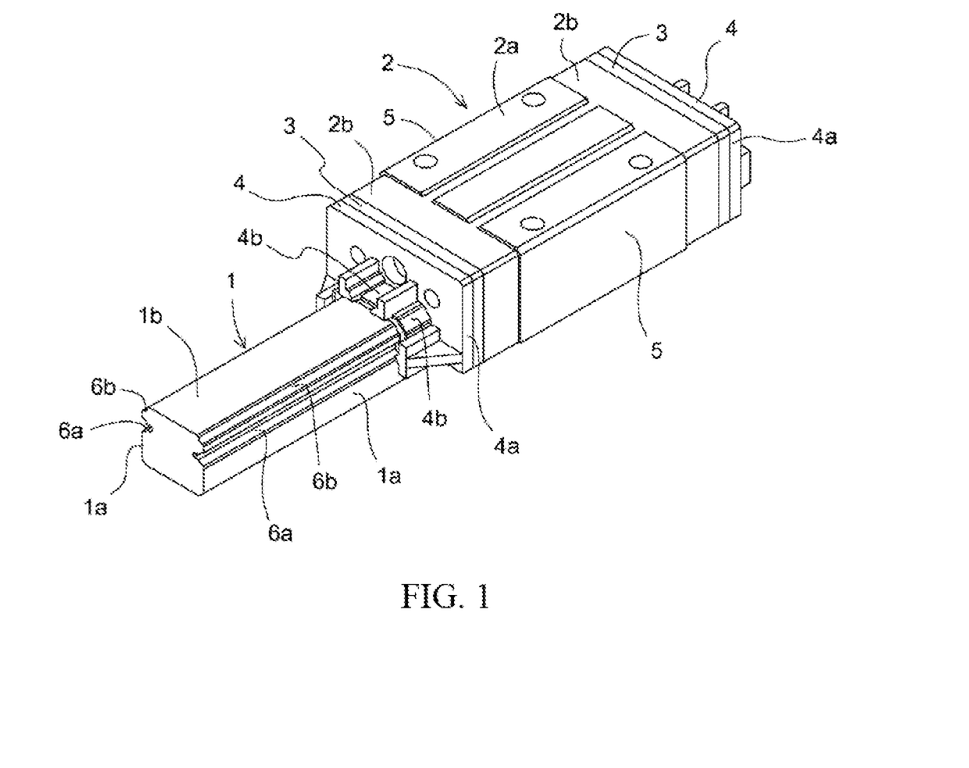
[FIG. 1] Perspective view showing an embodiment associated with the present invention in the form of an exemplary structure of a linear guide device.

FIG. 1 is a perspective view showing the structure of a first embodiment of the present invention which, based on a linear guide device employing conventional steel ball-like rolling body or bodies (described below using a linear motion guide device (LM Guide) manufactured by NSK Ltd. as an example of a linear motion mechanism), shows a situation in which a linear motion mechanism side seal unit 4 associated with the present invention has been installed in novel fashion on this conventional linear guide device. At the respective drawings which follow, note that like components in the drawings are assigned like reference numerals.

On linear motion guide rail 1 which is a shaft extending in the axial direction, slider 2 (e.g., C-shaped slider), shaped so as to cover linear motion guide rail 1, is assembled thereon in such fashion as to permit relative movement in the axial direction of linear motion guide rail 1. Formed at edge regions where top surface 1b of this linear motion guide rail 1 respectively intersects left and right side surfaces 1a, 1a are rolling body grooves 6b, 6b comprising quarter-circular arcuate recesses, and formed at locations midway in the vertical direction on left and right side surfaces 1a, 1a of linear motion guide rail 1 are rolling body grooves 6a, 6a comprising semicircular arcuate recesses.

Furthermore, slider 2 is made up of slider main body 2a and of end caps 2b, 2b which are removably attached at either end in the axial direction thereof, and further installed at the ends of end caps 2b are side seals 3, 3 made of rubber for sealing those gaps between linear motion guide rail 1 and slider 2 at which there are open portions at end caps 2b, 2b and 1b of linear motion guide rail 1 and side surfaces 1a, 1a of linear motion guide rail 1. These side seals 3, 3 which are made of rubber are elastomeric seals capable of being employed in a conventional linear motion guide device. Because these conventional elastomeric seals have high frictional resistance even when oil is applied thereto, they are prone to deterioration in contact characteristics due to abrasion.

In addition to side seals 3, 3 at the front end portion and back end portion thereof, a first embodiment of the present invention is therefore provided with linear motion mechanism side seal units 4, 4 comprising fibrous material as described below. First, through-holes provided for passage therethrough of left and right screws of side seals 3, 3 are used to respectively install linear motion mechanism side seal units 4, 4 at the front end portion and the back end portion of the slider. Each linear motion mechanism side seal unit 4 is made up of two parts, these comprising attachment 4a and seal member 4b. In more specific terms, these might for example be seal members 4b which comprise cut pile, for which it may be possible for oil to be retained in the spaces between the fibers of the cut pile, and which may be capable of preventing entry of even fine particulate matter of diameter on the order of several μm into gaps between linear motion guide rail 1 and slider 2, and which may possess seal characteristics that are even better than those of side seals 3.

Figure 2:
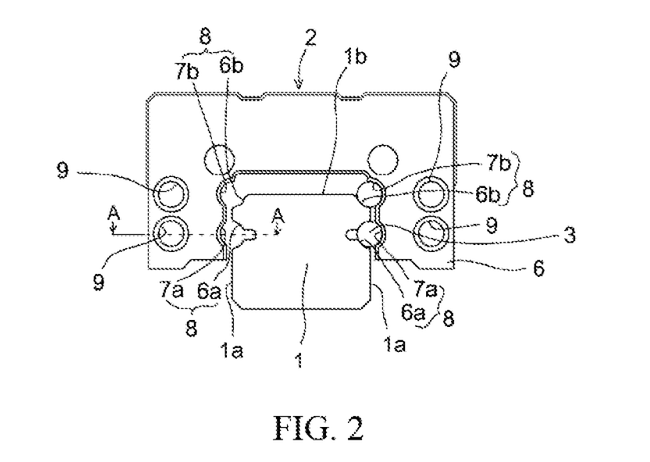
[FIG. 2] Front view of the linear guide device of FIG. 1, as viewed in the axial direction.

Formed at lower corner regions and at regions centrally located in the vertical direction on inside surfaces of left and right side faces 5, 5 of slider main body 2a are rolling body grooves 7a, 7a of more or less semicircular arcuate cross-section and rolling body grooves 7b, 7b of more or less quarter-circular arcuate cross-section which are opposed to semicircular arcuate rolling body grooves 6a, 6a and quarter-circular arcuate rolling body grooves 6b, 6b of linear motion guide rail 1. In addition, four sets of rolling body paths 8, 8, 8, 8 of more or less circular cross-section are formed as a result of the mutual opposition of semicircular arcuate rolling body grooves 6a, 6a and quarter-circular arcuate rolling body grooves 6b, 6b of linear motion guide rail 1 with semicircular arcuate rolling body grooves 7a, 7a and quarter-circular arcuate rolling body grooves 7b, 7b of slider main body 2a. These four rolling body paths 8 extend in the axial direction. Note that there is no limitation that the semicircular arcuate rolling body groove(s) 6a, quarter-circular arcuate rolling body groove(s) 6b, semicircular arcuate rolling body groove(s) 7a, and quarter-circular arcuate rolling body groove(s) 7b provided on linear motion guide rail 1 and slider 2 be provided thereon in such fashion that there are two rows at each side.

Moreover, slider 2 is provided, at upper and lower regions in the wall thicknesses of left and right side surfaces 5, 5 of slider main body 2a, with four linear paths 9, 9, 9, 9 comprising through-holes extending in the axial direction in such fashion as to be parallel to rolling body paths 8.

End cap 2b, which comprises injection-molded part(s) made from resin material(s), is formed in such shape that its cross-sectional shape covers linear motion guide rail 1. As shown in the cross-sectional view at FIG. 3, end caps 2b, 2b at either end of slider 2 have, at the left and right sides of the face (back surface) thereof which abuts slider main body 2a, half-donut-like curved paths 10 that provide passage between rolling body paths 8, 8 and linear paths 9, 9 parallel thereto. In addition, linear path 9 and curved paths 10, 10 at either end thereof form rolling body return path 11 for causing rolling body 12 to be recirculated as a result of being delivered from the end of rolling body path 8 to the beginning thereof, this rolling body return path 11 and rolling body path 8 forming a rolling body recirculation path. Spherical rolling bodies 12 are rollably loaded within this rolling body recirculation path, slider 2 being made to move in the axial direction along linear motion guide rail 1 constituting a shaft by virtue of the rolling of these rolling bodies 12.

Figure 3:
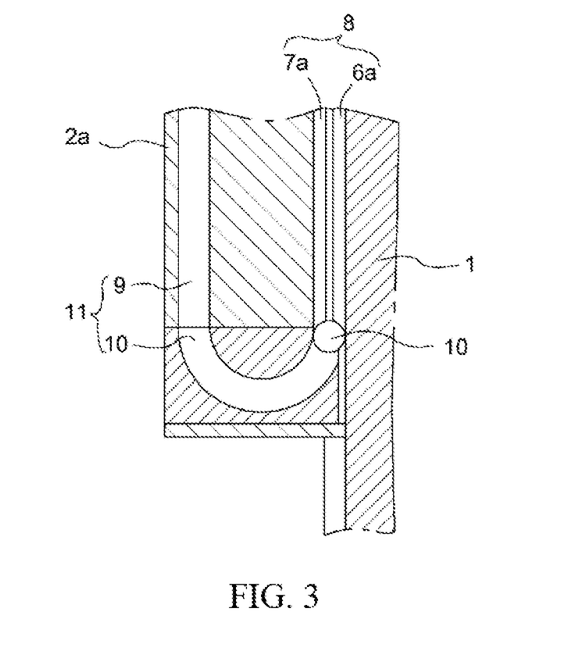
[FIG. 3] Sectional view of section A-A in FIG. 2.

When slider 2 which is assembled onto linear motion guide rail 1 is made to move in the axial direction along linear motion guide rail 1, rolling bodies 12 loaded within rolling body path 8, as they move within rolling body path 8, are made to move in the opposite direction as slider 2 relative to linear motion guide rail 1. In addition, when rolling body 12 reaches the end of rolling body path 8, it is delivered to curved path 10. After entering curved path 10, spherical steel rolling body 12 engages in a U-turn and is guided to linear path 9, following which it passes through linear path 9 to reach curved path 10 at the opposite end. It is here again made to engage in a U-turn and is returned to the beginning of rolling body path 8, such recirculation being repeated indefinitely.

Figure 4:
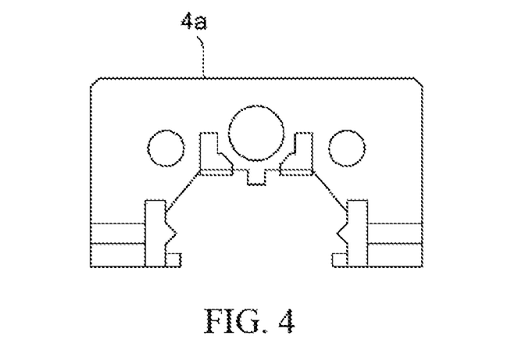
[FIG. 4] Front view of attachment of linear motion mechanism side seal unit.
Figure 5:
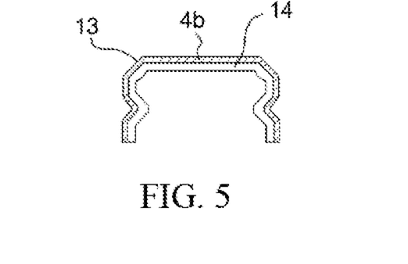
[FIG. 5] Front view of seal member of linear motion mechanism side seal unit.

Detailed description will now be given with respect to linear motion mechanism side seal unit 4. Linear motion mechanism side seal unit 4 is made up of two parts, these being attachment 4a and seal member 4b. FIG. 4 is a front view of attachment 4a, and FIG. 5 is a front view of seal member 4b. The way that seal member 4b is installed on attachment 4a to form linear motion mechanism side seal unit 4 is shown in FIG. 1. Seal member 4b for sealing those gaps between linear motion guide rail 1 and slider 2 at which there are open portions at end cap 2b of slider 2 and top surface 1b of linear motion guide rail 1 and side surfaces 1a, 1a of linear motion guide rail 1 is molded in such shape as to accommodate the shape of linear motion guide rail 1. Outer casing material 13 (base 18) of seal member 4b is bent, gaps between slider 2 and linear motion guide rail 1 above linear motion guide rail 1 being sealed by fibrous seal member 14 comprising a shape which follows the bending of outer casing material 13. Note that there is no limitation with respect to the shape of seal member 4b, it being possible for this to be varied as appropriate depending on the shape of slider 2 and linear motion guide rail 1. In the present embodiment, because side surfaces 1a, 1a of linear motion guide rail 1, quarter-circular arcuate rolling body grooves 6a, 6a at edge regions at the left and right of top surface 1b of linear motion guide rail 1, semicircular arcuate rolling body grooves 6b, 6b at the left and right of linear motion guide rail 1 have recesses, corresponding locations of the seal member are bent so as to permit sliding contact with such portions.

Conventional side seals 3, which have been such that surfaces thereof that come in contact with linear motion guide rail 1 have been formed from resin, elastomeric material, or the like, due to gaps which are produced as a result of the effects of twisting and/or detachment of lip contact surfaces during use and/or accuracy of attachment, have not been suitable for carrying out sealing with respect to fine dust or contaminants. Furthermore, depending on how they are used, one-sided contact may also occur, and this can produce effects similar to those described above. In this way, conventional examples have had difficulties with seal characteristics.

In contradistinction thereto, seal member 4b in accordance with the present invention, being a fibrous seal member 14, consistent with the properties of fibers, application of some load thereto makes it possible for contact to be achieved with surface(s) in sliding contact therewith as a result of accommodation of the shape thereof; moreover, by adjusting the density and diameter of fibers it will be possible to adequately carry out sealing with respect to even extremely fine particulate for which diameter is several μm. More specifically, this comprises cut pile that is captured by 1-denier polyester fiber at a density of 660,000 per square inch at the weft yarn in the ground yarn portion of a woven fabric. In concrete terms, pile fibers 24 of the cut pile might, for example, be polyester fibers, and because diameter thereof is on the order of 10 μm, not only are they extremely thin but the density thereof is also high and they are crowded together and napped, so that a multiplicity of napped pile members together are made to constitute a continuous surface serving as barrier with respect thereto, as a result of which it is possible for entry of fine particulate to be deflected away by the multiplicity of pile members, making it possible for removal thereof to be adequately achieved without occurrence of buckling due to pressure. Furthermore, because oil acting as lubricant can be adequately retained in gaps between adjacent pile members, with each sliding motion of the slider it is possible for oil with lubricating component to be repeatedly supplied to regions between it and the shaft, making it possible to easily maintain a greater degree of contact therebetween.

Furthermore, this seal member 4b is such that the ground yarn portion of a woven fabric is adhesively secured to one face of base 18 which is made of metal, the pile being napped from the weft yarn of the ground yarn, this base 18 being shaped in the form of outer casing material 13 such that the metal thereof is plastically deformed and bent so as to be made to curve and follow so as to conform to the inner wall of the casing of seal member 4b. Because base 18 is made of metal, during manufacture of the pile material, cut pile woven fabric can be made to adhere to a planar metal plate, following which this can be cut to desired size to obtain a seal member, and this may bent to match the shape in advance or right then and there, allowing it to be used in removably attachable and replaceable fashion as seal member 4b.

Note that POM may be used instead of metal as material for base 18. Because using a die to injection mold polyacetal resin will permit manufacture in large quantities, this will allow cost to be reduced and will produce a base that is light and has good endurance. With a POM base, because the shape will have been made to conform to location(s) in advance, it will be possible to obtain a seal member 4b in which cut pile woven fabric that has been cut in a shape suitable therefor is adhesively secured to the base. During replacement of seal member 4b, replacement of the part is accomplished by carrying out removal and attachment as the base is elastically deformed and stretched.

Now, with a conventional side seal 3, it had been necessary when wear had occurred to disassemble slider 2 in order to replace it. But because seal member 4b of linear motion mechanism side seal unit 4 in accordance with the present invention is merely made to engage therewith from the outside after attachment 4a has been secured to end cap 2b, it can be easily removed therefrom and it is possible for it to be replaced. Accordingly, maintenance characteristics are good, and convenience when used for an extended period of time is good.

A second embodiment, unlike the first embodiment, is a linear motion mechanism side seal unit such as may be employed by a linear motion mechanism using a linear motion guide device employing roller-shaped rolling body or bodies comprising steel as rolling body or bodies (not shown). Except for the fact that the rolling body or bodies are not steel spheres but are roller(s) comprising steel, and the rolling body race(s) are not circular groove(s) but are planar, the structure and operation of the linear motion guide device of the second embodiment is similar to that of the first embodiment. Accordingly, the seal member of the linear motion mechanism side seal unit is likewise shaped so as to accommodate this, and the attachment is likewise shaped so as to permit installation of the aforesaid seal member.

Figure 8:
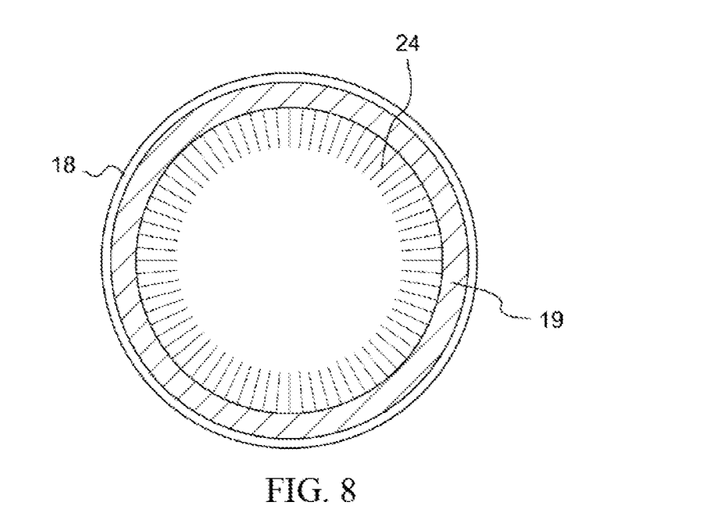
[FIG. 8] Drawing showing a cut-pile sealing member 4 b capable of being employed in a linear bushing, as seen from the side.
Figure 10:
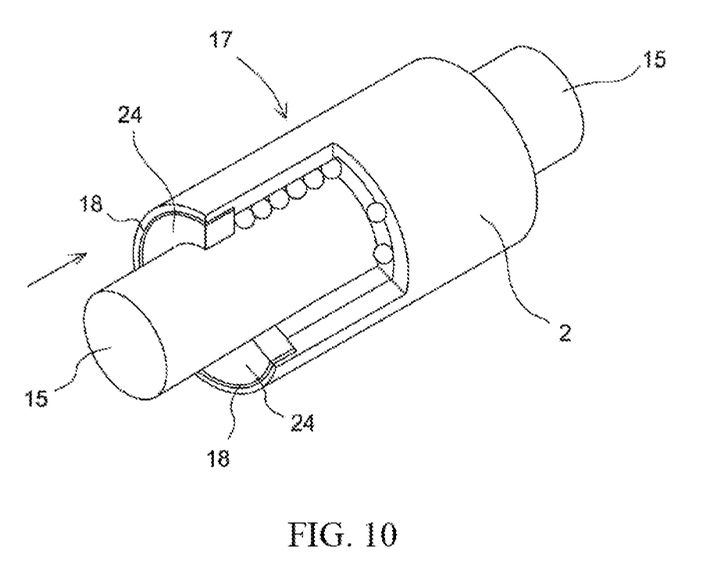
[FIG. 10] Perspective view showing structure of a linear bushing showing a third embodiment of the present invention.

In accordance with a third embodiment, as linear motion mechanism, there are linear bushing(s) 17 at which a slider carries out linear motion in an axial direction of a cylindrical shaft 16 mm in diameter, seal members 4b engaging with respective ring-like linear motion mechanism side seal units 4 at inner circumferential surfaces at the front end portion and rear end portion of the casing of cylindrical slider 2. Base 18 which is made of metal is C-shaped and is more or less circular, and, there being cutout(s) at location(s) on the circumference thereof, retraction of such cutout(s) causes a springback effect by which the outside diameter thereof is slightly reduced in size after the fashion of a spring, following which it is possible to cause seal member 4b to be captured by the inner wall of the casing of linear bushing 17. That is, because the outside diameter of base 18 is slightly larger than the inside diameter at either end portion of the casing of linear bushing 17, it is securely captured by the inner surface of the casing. Now, present at the inner surface of base 18 is ground yarn portion 19, to which napped pile fibers 24 are secured.

Below, although the present invention is described more specifically in terms of working examples, such descriptions should not be interpreted in a manner that would limit the scope of the present invention.

WORKING EXAMPLES

While a conventional linear motion guide device is such that a seal member made of nitrile rubber is attached thereto so as to prevent entry of dust and contaminants into the slider interior, it is possible for fine particulate to enter thereinto. For this reason, if dust or contaminant from the exterior enters the slider interior, it is clear that this will cause deterioration in rolling body lubricity and reduction in slider life.

Testing was therefore carried out to compare seal characteristics of a linear bushing 17 by itself such as might be installed in a conventional linear motion guide device versus seal performance when shaft seals of linear motion mechanism side seal unit 4 in accordance with the present invention were attached at the front end portion and rear end portion of slider 2 of linear bushing 17.

Exemplary Test 1: Determination of Performance of Seals in Linear Motion Mechanism Seal Units In this test, seal characteristics of a side seal unit in accordance with the present invention that was attached to a conventional linear motion guide device as used under wet conditions for which oil was applied so as to improve sliding characteristics and as used under dry conditions for which no oil was applied were compared with seal characteristics of a linear bushing by itself such as might be installed in a conventional linear motion guide device.

Materials and Methods

Figure 6:
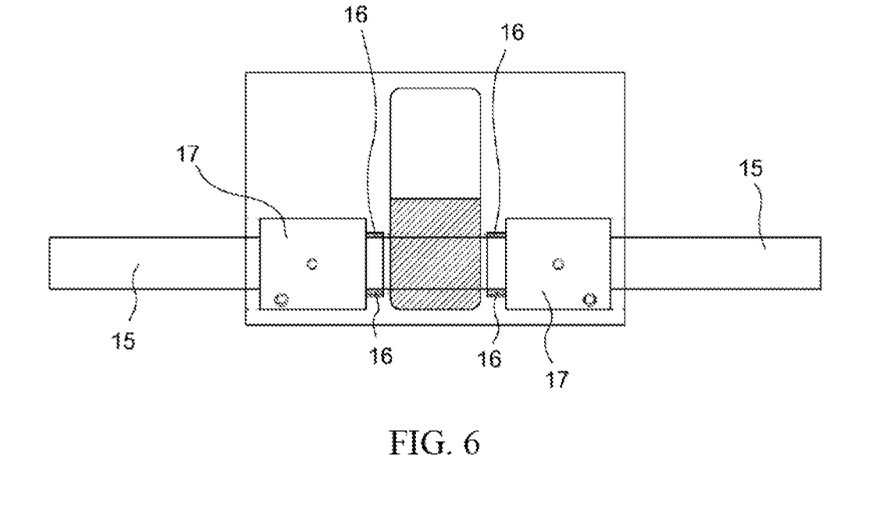
[FIG. 6] Drawing for describing overview of linear motion guide device employed for evaluation.

FIG. 6 shows an overview of a linear motion guide device that was employed for evaluation. Furthermore, TABLE 1 lists the LM shafts, shaft seals, and powders that were used for evaluation.

TABLE 1

|  |  | Shaft diameter | Outside diameter |
| --- | --- | --- | --- |
| Linear bushing |  | φ16 | φ28 |
|  |  | Shaft diameter | |
| LM shaft |  | φ16 | |
|  |  | Pile length used | External shape |
| Shaft seal used | t-type | 3.8 mm | φ20 |
|  | s-type | 2.2 mm | |
|  |  | Particle diameter | |
|  |  | Toner | Powdered iron |
| Powder used |  | 5 μm | 30 μm |

Because metal powder produced by friction of the apparatus as well as filings and other such metal powder is hard and may also have sharp corners, leakage thereof into regions inside end caps may cause damage to members comprising rubber or the like and/or resin of seal members making up conventional end caps and/or various metal members including linear motion guide rail(s) and so forth, and can interfere with stable operation of the linear motion guide device. Powdered iron of average particle diameter 30 µm was therefore selected as particle to model and reproduce the situation that exists with such metal powder produced by friction of the apparatus as well as filings and other such metal powder and other such hard granules. Furthermore, to also assess seal characteristics under conditions such as exist when dust and other such fine powder finer than the aforementioned granules are produced during use of the apparatus, magenta toner classified as a particulate possessing colorant functionality was selected as particle to model and reproduce the situation that exists with fine powder of average particle diameter on the order of 5 µm.

Attached at the end portions of the linear bushing in the aforementioned device were seal members made of rubber that were end caps of the conventional type. Whereupon, in the present testing, Working Examples were prepared in which shaft seals having seal members comprising fibrous material in accordance with the present invention were further employed outside the end caps, and a Comparative Example was prepared which did not employ a side seal unit, the manner of use thereof being of the conventional type (no seal member), and seal performance was evaluated. At the Working Examples, five shaft seal variations were chosen and made available for testing, these being examples of shaft seals employing seal members comprising fibrous materials in accordance with the present invention comprising pile fabric at which the material, shape, and pile length were varied.

Figure 7:
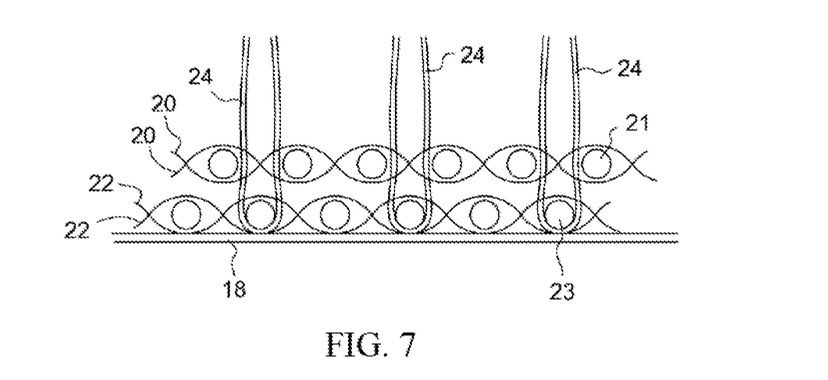
[FIG. 7] Schematic view showing woven structure peripheral to a cut-pile ground yarn portion of a shaft seal (s-type).

Details regarding the aforementioned t-type and s-type shaft seals are shown at TABLE 2. First, regarding the s-type shaft seal, napped pile fibers 24 were of a single type, being polyester fibers, and the ground yarn portion 19 of the base fabric was a woven fabric in which there were weft yarns (polyester) and warp yarns (Nylon 66/Nylon 6), being a double-woven fabric in which both the warp and the weft were double-woven and which comprised two layers, these being a front layer portion and a back layer portion. The cut pile was made up of pile fibers 24 which were 1.0-denier (approximately 10 µm in diameter) polyester fibers, the density of which was 660,000 per square inch.

Figure 9:
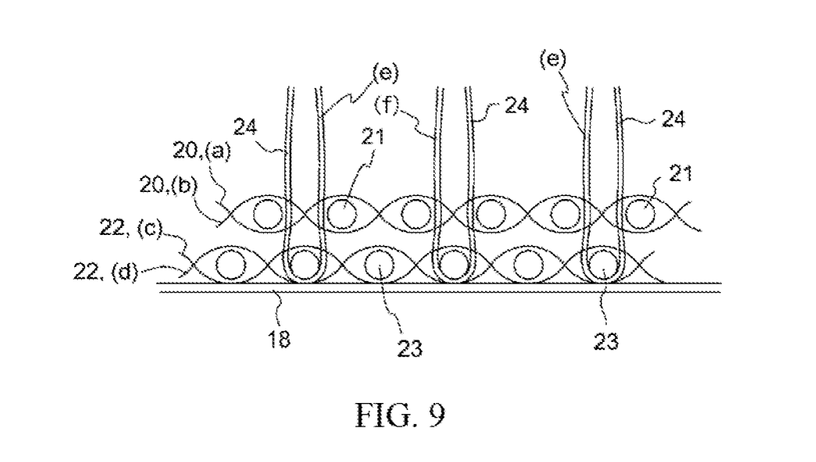
[FIG. 9] Schematic view showing woven structure peripheral to a cut-pile ground yarn portion of a shaft seal (t-type).

The t-type seal member had two types of napped pile fibers 24, pile fibers 24 being secured in alternating fashion one-type-at-a-time to the weft yarn of ground yarn portion 19 which constituted the base fabric. Pile 1 was a mixed yarn of 3.0-denier acrylic, 1.5-denier acrylic, and 1.5-denier rayon; Pile 2 comprised 0.5-denier polyester fiber. Fiber density was approximately 646,000 per square inch. In addition, ground yarn portion 19 of the base fabric to which the cut pile was secured was a double-woven fabric in which both the warp and the weft were double-woven and which comprised two layers, these being a front layer portion and a back layer portion, and which was a woven fabric in which there were weft yarns (polyester) and warp yarns (polyester/rayon).

In addition, to reduce shedding of cut pile, it is preferred that ground yarn portion 19 of the base fabric be impregnated with an acrylic emulsion from the back side thereof. Because causing the roots (portion entangled with the ground yarn) of the cut pile to be subjected to coating such that the ground yarn is made to contain an acrylic emulsion results in increased strength near the base fabric, and because it also increases viscosity, it reduces the tendency for cut pile to be easily shed and dislodged therefrom. If the cut pile is easily shed, because it may act as a foreign object and become entrapped by rail(s) and so forth, this may impede linear motion. Decreasing the tendency for cut pile to shed therefrom is therefore effective in decreasing occurrence of problems and permitting attainment of stable motion over a long period of time. In addition, by causing only regions near the ground yarn to be impregnated with an acrylic emulsion such that excessive amounts thereof are not present at cut pile regions other than those surrounding the ground yarn, i.e., by causing the height to which this is permeated thereby to be prevented from exceeding a height on the order of the height of the base fabric from the back surface, this is preferred because the tip ends of the pile yarn will not become hard, nor will this become an impediment even in situations where oil acting as lubricant is made to be present at the tip ends of the pile members.

TABLE 2

| | | Pile type | |
|---|---|---|---|
| | | Shaft seal: t-type | Shaft seal: s-type |
| Number of rows of pile | | 1           2 | 1 |
| Pile constitution | A | 3.0 D acrylic  0.5 D polyester | 1.0 D polyester |
| | B | 1.5 D acrylic | |
| | C | 1.5 D rayon | |
| Density (fiber/inch$^2$) | | 646,400 | 660,000 |
| Base fabric constitution | Weft yarn | 177 D polyester | 75.6 D polyester |
| | Warp yarn | 132 D × 2 polyester/rayon | 59.4 D Nylon/N Nylon |
| Coating | | Acrylic emulsion | Acrylic emulsion |

0.5 D polyester ≅ 7 µm
1.0 D polyester ≅ 10 µm

As shown in FIG. 7 and FIG. 8, the pile fabric used in the aforementioned shaft seals was pile fabric comprising napped cut pile in which the tips of loops of pile fibers that had been raised so as to be directed toward the inner surface from the ground yarn portion of the cut pile which was secured to the inner surface of a base made of metal or made of resin were cut, the cut pile ground yarn portion having a double-woven fabric structure in which both the warp and the weft were double-woven and which comprised two layers, these being a front layer portion in which there were front lining warp yarns and front weft yarns and a back layer portion in which there were back lining warp yarns and back weft yarns, the aforementioned pile fibers being captured by the back weft yarns.

TABLE 3 lists the various seal members that were attached to the linear bushing.

TABLE 3

| | Seal member that was attached thereto |
|---|---|
| Working Example 1 | Shaft seal: s-type; 2.0 mm pile length |
| Working Example 2 | Shaft seal: s-type; 2.5 mm pile length |
| Working Example 3 | Shaft seal: t-type; 2.0 mm pile length |
| Working Example 4 | Shaft seal: t-type; 2.5 mm pile length |
| Working Example 5 | Shaft seal: t-type; 3.8 mm pile length |
| Comparative Example 6 | No seal member |

At the foregoing device, oil was applied to the linear bushing, this being referred to when used in that state as a situation in which oil was present; where the linear bushing was wiped clean of oil or no linear bushing was employed, this was referred to as a situation in which oil was absent. Furthermore, the powder used that was employed for evaluation of leakage was carried out with two varieties, these being only carrier and only toner. Linear motion distance was set to be 10 cm per iteration of reciprocating motion.

In addition, linear bushings were mounted at two locations on the LM shaft, and the shaft was made to engage in linear motion in such fashion as to come in direct contact with powder which was provided at a location therebetween, with evaluation being carried out with respect to linear bushings alone, shaft seal pile length, and presence versus absence of oil. Evaluation was carried out by attaching the shaft seals between the powder and the linear bushings, cumulative distance traveled being calculated from the number of iterations of reciprocating motion until the time that leakage occurred, this being such that the higher the value the better were the seal characteristics.

Results

Seal characteristics with respect to powder were evaluated in accordance with the aforementioned method. Results are shown in TABLE 4.

Whereupon, for the foregoing Working Examples for which conditions were such that powdered iron was used and oil was absent, at a point in time when distance traveled as a result of linear motion had reached 10 km, i.e., at a point in time when leakage had not occurred as indicated at TABLE 4, above, the shaft seals were replaced with new versions thereof and oil was applied thereto, following which linear motion was resumed, upon which it was found that no leakage occurred until a distance was reached that was on the order of that observed when oil was present.

It is typically the case that endurance of a linear bushing when used without oil or grease, converting units to express this in terms of cumulative distance traveled, is on the order of 470 km. Based on the current test results, it was determined that, when a multiplicity of powders such as carrier are present in the atmosphere serving as environment in which the apparatus is used, the life of a linear bushing is reduced to $1/100$th or less of what it would otherwise have been, but if shaft seals in accordance with the present invention are used, then it is possible for the life which would have been reduced to $1/100$th or less to be increased by 4 to 5 times.

TABLE 4

| Sample being evaluated | Seal characteristics with respect to powder | | | |
|---|---|---|---|---|
| | Powdered iron ($\varphi 30$ μm) | | Toner ($\varphi 5$ μm) | |
| | Oil present | Oil absent | Oil present | Oil absent |
| Working Example 1 (shaft seal: s; 2.0 mm) | Leakage occurred at 50 km | Leakage occurred at 13 km | Leakage occurred at 500 m | Leakage occurred at 10 m |
| Working Example 2 (shaft seal: s; 2.5 mm) | Leakage occurred at 60 km | Leakage occurred at 16 km | Leakage occurred at 4 km | Leakage occurred at 100 m |
| Working Example 3 (shaft seal: t; 2.0 mm) | Leakage occurred at 50 km | Leakage occurred at 13 km | Leakage occurred at 500 m | Leakage occurred at 10 m |
| Working Example 4 (shaft seal: t; 2.2 mm) | Leakage occurred at 55 km | Leakage occurred at 13 km | Leakage occurred at 2 km | Leakage occurred at 50 m |
| Working Example 5 (shaft seal: t; 3.8 mm) | Leakage occurred at 70 km | Leakage occurred at 18 km | Leakage occurred at 4 km | Leakage occurred at 100 m |
| Comparative Example 6 (no seal member) | Leakage occurred at 40 km | Leakage occurred at 3 km | Leakage occurred at 10 m | Leakage occurred at 0.1 m |

(Values are bushing travel distance)

As a result of testing, it was determined that, with a powder such as toner for which particle diameter is extremely small, no sealing effect was observed when no seal member was present (Comparative Example 6).

However, when shaft seals in accordance with the present invention were employed, good sealing effect, of a degree not attained with conventional structures, was observed (Working Example 1 through Working Example 5); moreover, it was determined that, by controlling pile length, extremely good sealing effect which was 1000 times better or more could be observed under harsh conditions such as those that existed when oil was absent.

Moreover, with respect to powdered iron that was on the order of 30 μm such as is the case with carrier, it was determined that, by controlling pile length, devices in accordance with the present invention could be made to possess a life that was on the order of 5 times greater than that of devices of conventional structure under harsh situations such as existed when oil was absent (respective Working Examples).

Furthermore, under harsh conditions such as those in which a multiplicity of fine powders comprising extremely fine particles such as toner are present in the atmosphere serving as environment in which the apparatus is used, while the life of the linear bushing does tend to be shortened, it was determined that use of shaft seals in accordance with the present invention makes it possible to reduce the degree to which the life of the linear bushing is shortened, making it possible to expect a dramatic life extending effect that is as much as 1,000 times greater than was the case conventionally.

Apparatuses employing linear bushings have conventionally been employed in such fashion that use of oil for the purpose of extending the life of the linear bushings has been commonplace. However, when used for a long period of time, there will always be situations in which the apparatus runs out of oil. It is therefore necessary to carry out regular maintenance operations in which the apparatus is resupplied with oil and operational conditions are maintained.

However, it is not always the case that maintenance operations are carried out at prescribed times, in which case there will be delay in maintenance operations and the apparatus will run out of oil. In addition, where an apparatus has run out of oil even once, because the conventional situation, which was also observed at the foregoing testing, is that life is extremely short after the apparatus has run out of oil, leakage of powder causes occurrence of problems and/or damage in apparatuses using linear bushings. Furthermore, where an apparatus run out of oil due to some problem that occurs before the ordinary maintenance operation is scheduled to be carried out, and the fact that the apparatus has run out of oil is not noticed by the user, because the conventional situation is that life is extremely short after the apparatus has run out of oil, leakage of powder causes occurrence of problems and/or damage in the apparatus.

But as is clear from the foregoing testing, employment of shaft seals in accordance with the present invention at a linear motion guide device makes it possible to ensure that even after occurrence of a situation in which an apparatus runs out of oil, life from that point forward will be long, being anywhere from at least 4 to 5 times to on the order of 1,000 times that of preexisting devices. As a result, because longer time is available for the user to notice that the apparatus has run out of oil, and because there will be no leakage of powder in the meantime, it is clear that that it will be possible to effectively prevent occurrence of damage and problems at the device, and moreover, by in the meantime carrying out maintenance procedures in which shaft seals are replaced and resupplied with oil, it is clear that it will be possible to effectively prevent occurrence of damage and problems at the device for longer periods of time.

Exemplary Test 2: Measurement of Torque Necessary To Cause Movement

During this test, torque necessary to cause movement of the linear bushing when various seal member were attached thereto was measured. Determination was carried out to see whether employment of seal members in accordance with the present invention caused increase in torque necessary to cause movement such as might interfere with operation of the device.

Materials and Methods

Apparatuses and seal members similar to those at Exemplary Test 1 were employed. Shaft seals and linear bushings were attached under the same conditions as was the case for evaluation of seal characteristics. The measuring unit of a digital force gauge was secured to the machine to be evaluated at which the shaft had previously been inserted, and the machine to be evaluated was pulled, the torque at the instant that it began to move being recorded.

Results

Torque necessary to cause movement was evaluated in accordance with the aforementioned method. Results are shown in TABLE 5.

TABLE 5

| | | Torque measurement (kgf) | |
| --- | --- | --- | --- |
| | | Oil present? | |
| | Seal member that was attached thereto | Oil present | Oil absent |
| Working Example 1 | Shaft seal: s-type (pile length 2.0 mm) | 0.50 | 0.60 |
| Working Example 2 | Shaft seal: s-type (pile length 2.5 mm) | 0.55 | 0.85 |

TABLE 5-continued

| | | Torque measurement (kgf) | |
| --- | --- | --- | --- |
| | | Oil present? | |
| | Seal member that was attached thereto | Oil present | Oil absent |
| Working Example 3 | Shaft seal: t-type (pile length 2.0 mm) | 0.45 | 0.50 |
| Working Example 4 | Shaft seal: t-type (pile length 2.2 mm) | 0.45 | 0.57 |
| Working Example 5 | Shaft seal: t-type (pile length 3.8 mm) | 1.00 | 1.00 |
| Comparative Example 6 | No seal member | 0.10 | 0.20 |

Under conditions such that seal members were present such as was the case in the Working Examples where shaft seals were employed, while torque value increased somewhat as compared with the situation in which no seal member was employed, so long as pile length was not too great, this was judged to be within the range of values for which the apparatus could be used with no problem. In addition, it is thought that a pile length on the order of 2.5 mm is preferred. Furthermore, it was possible by appropriately selecting the type of the seal member to cause the increase in torque to be reduced still further.

As described above, it is clear that by causing a linear bushing of a linear motion guide device to be further equipped with shaft seals in accordance with the present invention it will be possible to ensure dramatic longevity as well as low torque even in environments in which a multiplicity of fine powders are present.

EXPLANATION OF REFERENCE NUMERALS

1 Linear motion guide rail
1a Side surface (of linear motion guide rail 1)
1b Top surface (of linear motion guide rail 1)
2 Slider
2a Slider main body
2b End cap
3 Side seal
4 Linear motion mechanism side seal unit
4a Attachment
4b Seal member
5 Left and right side faces of slider main body
6a (Linear motion guide rail 1 semicircular arcuate) rolling body groove of linear motion guide rail
6b (Linear motion guide rail 1 quarter-circular arcuate) rolling body groove of linear motion guide rail
7a (Slider 2 semicircular arcuate) rolling body groove of slider main body
7b (Slider 2 quarter-circular arcuate) rolling body groove of slider main body
8 Rolling body path
9 Linear path
10 Curved path
11 Rolling body return path
12 (Spherical steel) rolling body
13 Outer casing material
14 Fibrous seal member
15 LM shaft
16 Shaft seal
17 Linear bushing
18 Base
19 Ground yarn portion
20 Front lining warp yarn
21 Front weft yarn 22 Back lining warp yarn
23 Back weft yarn
24 Pile fiber

The invention claimed is:

1. A linear motion mechanism, comprising:
a slider that is configured to linearly reciprocate along an axis of a shaft, said slider including a plurality of rolling bodies arranged to roll axially along the shaft,
a pair of linear motion mechanism side seal units for sealing gaps along the shaft at a front end portion and a back end portion of the slider which carries out reciprocating linear motion on the shaft,
each of the linear motion mechanism side seal units including:
an outer casing material having a bent portion;
a seal member having a fibrous surface with a shape which follows the bent portion of the outer casing material;
wherein said fibrous surface of said seal member comprising fibrous material arranged so as to be directed toward the shaft in a manner to abut and conform to a cross-sectional shape of the shaft at the front end portion and the back end portion of the slider; and
said fibrous material including a cut pile fabric having cut loops of pile fibers raised from a ground yarn portion which is secured to an inner surface of a base, wherein tips of said cut loops of pile fibers spread out in a radial fashion towards ends of the tips such as to facilitate retention of lubricant and to eliminate gaps.

2. The linear motion mechanism according to claim 1, wherein the cut pile ground yarn portion has a double-woven fabric structure in which both the warp and the weft are double-woven and which comprises two layers, these being a front layer portion in which there is a front lining warp yarn and a front weft yarn, and a back layer portion in which there is a back lining warp yarn and a back weft yarn, the pile fibers being captured by the back weft yarn.

3. The linear motion mechanism according to claim 1, wherein the cut pile ground yarn portion has a double-woven fabric structure in which both the warp and the weft are double-woven and which comprises two layers, a front lining warp yarn (a) and a front lining warp yarn (b) intersecting in alternating fashion, sandwiching a front weft yarn therebetween, to form a front layer portion, a back lining warp yarn (c) and a back lining warp yarn (d) intersecting in alternating fashion, sandwiching a back weft yarn therebetween, to form a back layer portion, pile fiber captured by back weft yarns comprising two fibrous materials (e) and (f), the pile fiber (e) and the pile fiber (f) being alternately captured by adjacent ones of the back weft yarns.

4. The linear motion mechanism according to claim 1, wherein the seal members comprising fibrous material are wet seal members in which lubricant is retained in spaces between fibers.

5. The linear motion mechanism according to claim 1, wherein the ground yard portion of the base fabric is impregnated with an acrylic emulsion.

6. The linear motion mechanism according to claim 5, wherein only regions near the ground yarn are impregnated with an acrylic emulsion.

7. The linear motion mechanism according to claim 5, wherein only regions near the ground yarn are impregnated with an acrylic emulsion such that said lubricant is not impeded from being retained between said fibers.

8. The linear motion mechanism according to claim 1, wherein said slider is configured to reciprocate linearly with respect to the axis of the shaft without rotation around with respect to the axis of the shaft.

9. A linear motion mechanism, comprising:
a shaft;
a slider that is linearly reciprocated along the shaft, said slider including a plurality of rolling bodies arranged to roll axially along the shaft;
a pair of sealing units for sealing gaps along the shaft at a front end portion and at a back end portion of the slider, each of said sealing units including an outer casing material having a bent portion and a seal member having a fibrous surface with a shape which follows the bent portion of the outer casing material;
wherein said fibrous surface of said seal member having fibrous material arranged so as to be directed toward the shaft in a manner to abut and conform to a cross-sectional shape of the shaft at the front end portion and the back end portion of the slider;
said fibrous material including a cut pile fabric having cut loops of pile fibers raised from a ground yarn portion which is secured to an inner surface of a base, wherein tips of said cut loops of pile fibers spread out in a radial fashion towards ends of the tips such as to facilitate retention of lubricant and to eliminate gaps.

10. The linear motion mechanism according to claim 9, wherein the seal members comprising fibrous material are wet seal members in which lubricant is retained in spaces between fibers ground yard portion of the base fabric is impregnated with an acrylic emulsion.

11. The linear motion mechanism according to claim 10, wherein only regions near the ground yarn are impregnated with an acrylic emulsion such that said lubricant is not impeded from being retained between said fibers.

12. The linear motion mechanism according to claim 9, wherein said slider is configured to reciprocate linearly with respect to the axis of the shaft without rotation around with respect to the axis of the shaft.

* * * * *